(12) United States Patent
Cheng et al.

(10) Patent No.: US 12,326,916 B2
(45) Date of Patent: Jun. 10, 2025

(54) METHOD OF GENERATING IMAGE RECOGNITION MODEL AND ELECTRONIC DEVICE USING THE METHOD

(71) Applicant: Coretronic Corporation, Hsin-Chu (TW)

(72) Inventors: Ching-Wen Cheng, Hsin-Chu (TW); Yen-Chun Huang, Hsin-Chu (TW); Yi-Fan Liou, Hsin-Chu (TW); Kui-Ting Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 459 days.

(21) Appl. No.: 17/513,896

(22) Filed: Oct. 29, 2021

(65) Prior Publication Data

US 2022/0171994 A1  Jun. 2, 2022

(30) Foreign Application Priority Data

Dec. 2, 2020 (CN) .......................... 202011402819.2

(51) Int. Cl.
*G06F 18/214* (2023.01)
*G06N 20/00* (2019.01)
(Continued)

(52) U.S. Cl.
CPC ............ *G06F 18/214* (2023.01); *G06V 10/22* (2022.01); *G06V 10/267* (2022.01); *G06V 10/40* (2022.01); *G06N 20/00* (2019.01); *G06V 40/16* (2022.01)

(58) Field of Classification Search
CPC .... G06F 18/214; G06V 10/22; G06V 10/267; G06V 10/40; G06V 40/171; G06V 40/172;
(Continued)

(56) References Cited

U.S. PATENT DOCUMENTS 9,875,736 B2   1/2018  Kim et al.
11,163,982 B2 * 11/2021  Han ..................... G06V 40/172
(Continued)

FOREIGN PATENT DOCUMENTS

CN  108573211  9/2018
CN  108921043  11/2018
(Continued)

OTHER PUBLICATIONS

Rajeev Thaware, "Real-time face detection and recognition using SVM and HOG features", Electronic Engineering Issue, 29-32, Aug. 2018. Monday, May 28, 2018 URL: https://www.eeweb.com/real-time-face-detection-and-recognition-with-svm-and-hog-features/ (Year: 2018).*
(Continued)

*Primary Examiner* — Umair Ahsan
(74) *Attorney, Agent, or Firm* — JCIPRNET

(57) ABSTRACT

The invention provides a method of generating an image recognition model and an electronic device using the method. The method includes the following. A source image is obtained; a first image is cut out of a first region of the source image to generate a cut source image; a preliminary image recognition model is pre-trained according to feature data and label data, in which the feature data is associated with the cut source image, and the label data is associated with the first image; and the pre-trained preliminary image recognition model is fine-tuned to generate the image recognition model. The method of generating the image recognition model and the electronic device provided by the invention may correctly restore an input image.

10 Claims, 4 Drawing Sheets

(51) Int. Cl.
*G06V 10/22* (2022.01)
*G06V 10/26* (2022.01)
*G06V 10/40* (2022.01)
*G06V 40/16* (2022.01)

(58) Field of Classification Search
CPC ........ G06V 10/82; G06N 20/00; G06N 3/045;
G06N 3/08; G06T 7/11; G06T 5/70
See application file for complete search history.

(56) References Cited

U.S. PATENT DOCUMENTS

| | | | |
|---|---|---|---|
| 2017/0046562 | A1 | 2/2017 | Juefei-Xu et al. |
| 2019/0012594 | A1 | 1/2019 | Fukuda et al. |

FOREIGN PATENT DOCUMENTS

| | | |
|---|---|---|
| CN | 109741268 | 5/2019 |
| CN | 109785258 | 5/2019 |
| CN | 109919156 | 6/2019 |
| CN | 110288537 | 9/2019 |
| CN | 111542829 | 8/2020 |
| KR | 20030084570 | 11/2003 |
| WO | 2016090522 | 6/2016 |

OTHER PUBLICATIONS

He Zhixiang, "A huge collective of mainstream face recognition algorithms with high precision and performance ", InfoQ—Column Article on face recognition technology—Part 2 https://www.infoq.cn/article/Kg- 86 juaHo6P1JG69rNs, May 13, 2019. (Year: 2019).*
Rajeev Thaware, "Real-Time Face Detection and Recognition With SVM and HOG Features", Electronic Engineering Times, with English translation thereof, Aug. 2018, pp. 29-31.
He Zhixiang, "A Huge Collection of Mainstream Face Recognition Algorithms With High Precision and Performance, Facial Recognition Technology (Feature Article 2)", with English translation thereof, retrieved on May 13, 2019, Available at: https://www.infoq.cn/article/kg-86juaho6pljg69ms, pp. 3-11, 23-27.
"Office Action of Taiwan Counterpart Application", issued on Jun. 7, 2022, p. 1-p. 11.
Ashish Vaswani et al., "Attention is all you Need", arXiv, Dec. 2017, pp. 1-15.
Dipanjan (DJ) Sarkar, "A Comprehensive Hands-on Guide to Transfer Learning with Real-World Applications in Deep Learning", retrieved on Oct. 28, 2021, https://towardsdatascience.com/a-comprehensive-hands-on-guide-to-transfer-learning-with-real-world-applications-in-deep-learning-212bf3b2f27a.
Chen; Jun-Zhou et al., "Face Image Inpainting Using Cascaded Generative Adversarial Networks", Journal of University of Electronic Science and Technology of China, with English abstract, Nov. 30, 2019, pp. 910-917, vol. 48, No. 6.
Zhenping Qiang et al., "Face Inpainting with Deep Generative Models", International Journal of Computational Intelligence Systems, Oct. 29, 2019, pp. 1232-1244, vol. 12, No. 2.
"Office Action of China Counterpart Application", issued on May 8, 2024, p. 1-p. 11.

* cited by examiner 71　　　　　72

METHOD OF GENERATING IMAGE RECOGNITION MODEL AND ELECTRONIC DEVICE USING THE METHOD

CROSS-REFERENCE TO RELATED APPLICATION

This application claims the priority benefit of China application serial no. 202011402819.2, filed on Dec. 2, 2020. The entirety of the above-mentioned patent application is hereby incorporated by reference herein and made a part of this specification.

BACKGROUND

Technical Field

The invention relates to a method of generating an image recognition model and an electronic device using the method.

Description of Related Art

In the field of image recognition (face recognition) and machine learning, transfer learning has become one of the important methods of training an image recognition model. A standard transfer learning process may include pre-training the model and fine-tuning the model. Pre-training the model includes the following. Source data containing a large amount of data is configured to pre-train the model; appropriate feature data is identified to establish a preliminary image recognition model; and specific target data is configured to fine-tune the model. When the appropriate feature data cannot be identified in the process of pre-training the model, even if the model is fine-tuned with the specific target data, the model is still unable to yield a fine result. Obtaining the appropriate feature data is particularly important in a face recognition technology. It is especially the case when face information is incomplete (such as being covered by bangs, glasses, a mask, etc.). Therefore, developing a method of obtaining the appropriate feature data is certainly an issue to work on in the field.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a method of generating an image recognition model and an electronic device using the method. The method may generate feature data adapted for pre-training and fine-tuning.

An aspect of the invention provides a method of generating an image recognition model. The method includes the following. A source image is obtained; a first image is cut out of a first region of the source image to generate a cut source image; a preliminary image recognition model is pre-trained according to first feature data and first label data to generate a pre-trained preliminary image recognition model, in which the first feature data is associated with the cut source image, and the first label data is associated with the first image; and the pre-trained preliminary image recognition model is fine-tuned to generate the image recognition model.

Another aspect of the invention provides an electronic device adapted for generating an image recognition model. The electronic device includes a transceiver and a processor. The transmitter obtains a source image. The processor is coupled to the transmitter, and is configured to: cut a first image out of a first region of the source image to generate a cut source image; pre-train a preliminary image recognition model according to first feature data and first label data to generate a pre-trained preliminary image recognition model, in which the first feature data is associated with the cut source image, and the first label data is associated with the first image; and fine-tune the pre-trained preliminary image recognition model to generate the image recognition model.

Based on the above, according to the embodiments of the invention, the source image or the target image is cut, and the cut source image or the cut target image is adapted for pre-training and fine-tuning the image recognition model.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "Coupled," and "mounted," and variations thereof herein are used broadly and encompass direct and indirect connections, couplings, and mountings.

Figure 1:
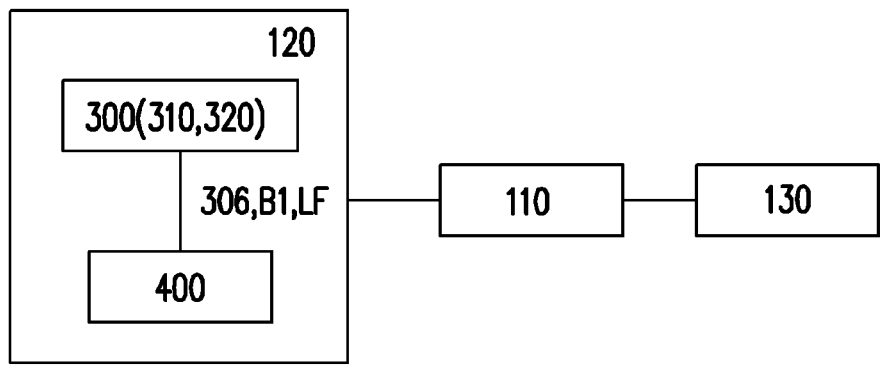
FIG. 1 is a schematic diagram of an electronic device that generates an image recognition model according to an embodiment of the invention.

FIG. 1 is a schematic diagram of an electronic device that generates an image recognition model according to an embodiment of the invention. An electronic device 100 may include a processor 110, a storage medium 120, and a transceiver 130. The electronic device 100 may execute pre-training to generate a preliminary image recognition model, and may fine-tune the preliminary image recognition model to generate an image recognition model.

The processor 110 is, for example, a central processing unit (CPU), or a programmable general-purpose or special-purpose micro control unit (MCU), microprocessor, digital signal processor (DSP), programmable controller, application specific integrated circuit (ASIC), graphics processor (graphics processing unit, GPU), image signal processor (ISP), image processing unit (IPU), arithmetic logic unit (ALU), complex programmable logic device (CPLD), field programmable gate array (FPGA), or a similar component or a combination of the components mentioned above. The processor 110 may be coupled to the storage medium 120 and the transceiver 130, and may access and execute multiple modules and various applications stored in in the storage medium 120, such as generating an image recognition model. The processor 110 may, for example, read each step (or a computing layer) or process of a module or an application of the storage medium 120 and perform calculation, and then output a calculation result to the module or the application (or the computing layer) corresponding to the storage medium 120.

The storage medium 120 is, for example, any type of fixed or movable random access memory (RAM), read-only memory (ROM), flash memory, hard disk drive (HDD), solid state drive (SSD) or a similar component or a combination of the components mentioned above, and is adapted for storing the modules or various applications that may be executed by the processor 110 to implement a method of generating the image recognition model of the invention. The storage medium 120 may include, for example, a preliminary image recognition model 300 (or a pre-trained preliminary image recognition model 310 and an image recognition model 320) and a loss function calculation model 400.

The transceiver 130 delivers and receives a signal in a wireless or a wired manner. The transceiver 130 may further execute operations such as low noise amplification, impedance matching, frequency mixing, a frequency up-conversion or a frequency down-conversion, filtering, amplification, and other similar operations.

Figure 2:
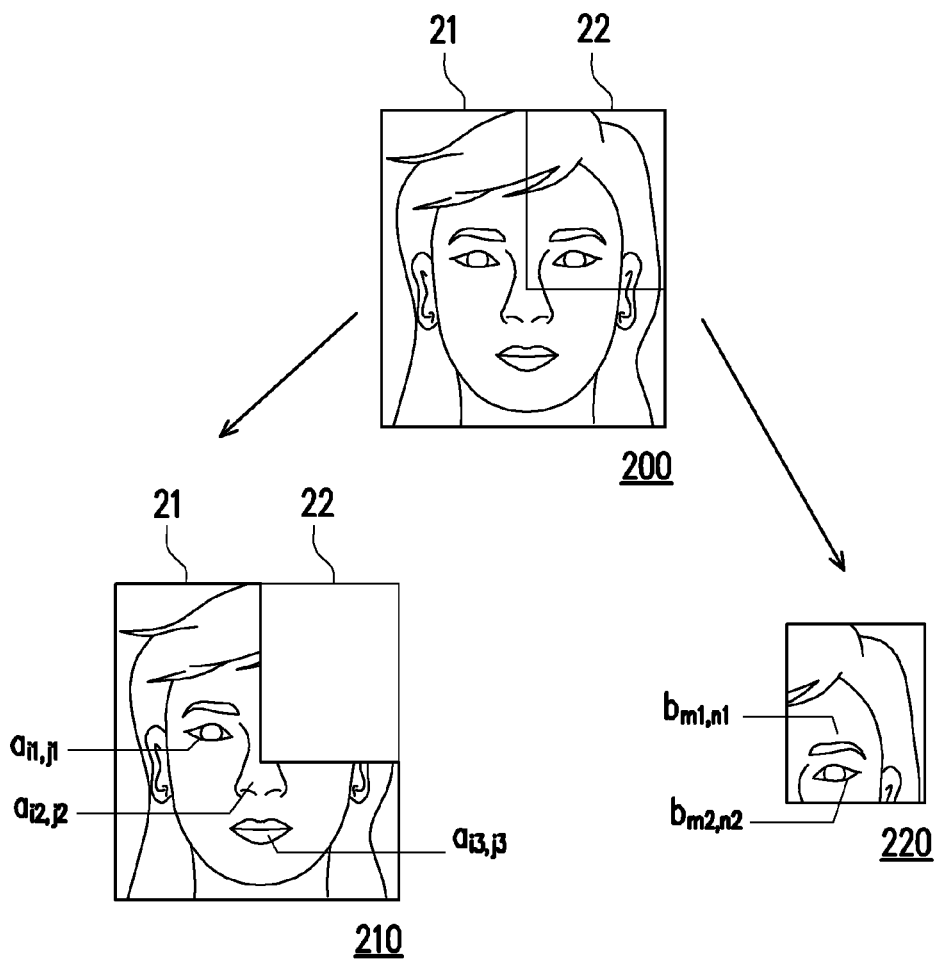
FIG. 2 is a schematic diagram of cutting a source image according to an embodiment of the invention.
Figure 3:
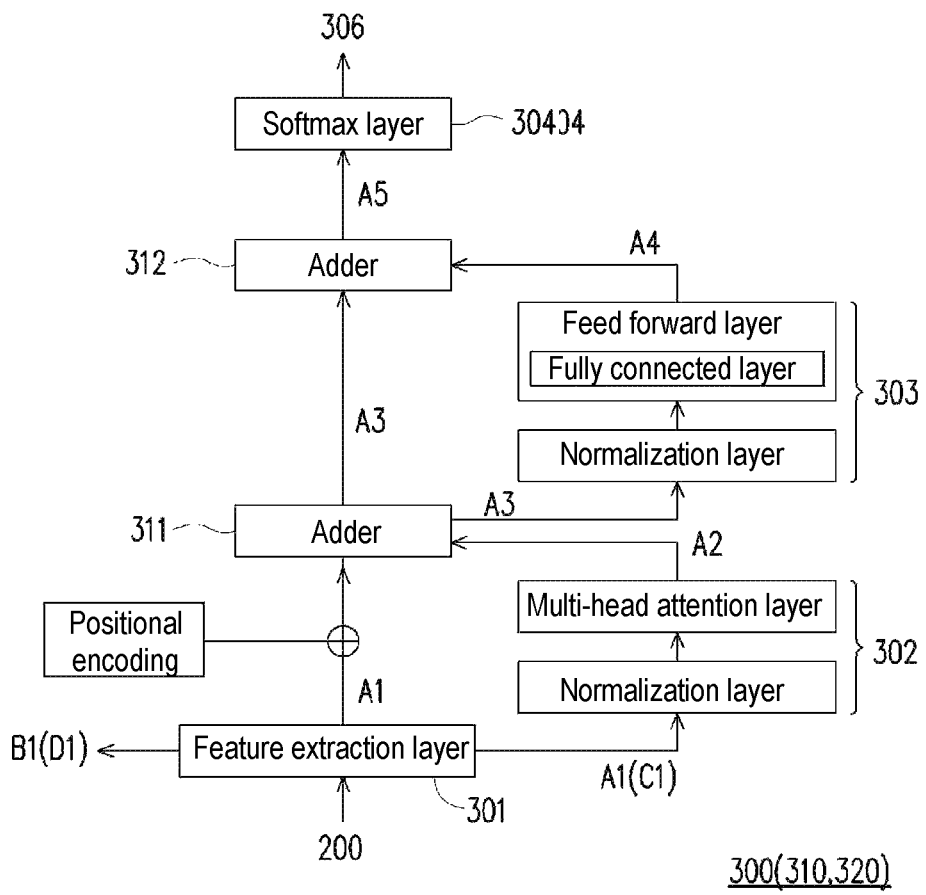
FIG. 3 is a schematic diagram of pre-training a preliminary image recognition model according to an embodiment of the invention.

FIG. 2 is a schematic diagram of cutting a source image according to an embodiment of the invention, and FIG. 3 is a schematic diagram of pre-training a preliminary image recognition model according to an embodiment of the invention. Referring to FIGS. 1 to 3 together, the processor 110 may obtain multiple source images 200 through the transceiver 130. The source image 200 may include a first region 22 and an other region 21. Specifically, the area of the first region 22 is smaller than the area of the other region 21. For example, the area of the first region 22 is ⅓ times of the area of the other region 21. After obtaining the source image 200, the processor 110 may cut a first image 220 out of the first region 22 of the source image 200 to generate a cut source image 210. It is to be noted that, cutting refers to deleting information in the first region 22 of the source image 200 and saving the information in the first region 22 as the first image 220. The size of the cut source image 210 is the same as the size of the source image 200, but the invention is not limited thereto.

Then, the processor 110 may pre-train the preliminary image recognition model 300 according to first feature data A1 and first label data B1 to generate the pre-trained preliminary image recognition model 310. The first feature data A1 may be associated with the cut source image 210, and the first label data B1 may be associated with the first image 220. The pre-trained preliminary image recognition model 310 is fine-tuned to generate the image recognition model 320. In an embodiment, the processor 110 may encode the cut source image 210 to configure the cut source image 210 as the first feature data A1, and the processor 110 may encode the first image 220 to configure the first image 220 as the first label data B1.

Specifically, the preliminary image recognition model 300 is, for example, the architecture of a neural network model as shown in FIG. 3, but the invention is not limited thereto. In other embodiments, practitioners in this field may choose different network models as the preliminary image recognition model according to different image recognition scenarios. The preliminary image recognition model 300 may include a feature extraction layer 301, a layer 302, a layer 303, and a softmax layer 304. The feature extraction layer 301 of the preliminary image recognition model 300 may encode at least one region of the cut source image 210 according to a feature extraction algorithm to generate at least one embedding matrix of the source image as shown in a matrix (1), respectively, in which i is greater than or equal to 1, and j is greater than or equal to 1. Taking FIG. 2 as an example, an element in a first embedding matrix of the source image may include an element $a_{i_1,j_1}$ ($1 \le i1 \le i$, $1 \le j1 \le j$) generated by encoding the right eye region of the portrait in the cut source image 210 through the feature extraction algorithm; an element in a second embedding matrix of the source image may include an element $a_{i_2,j_2}$ ($1 \le i2 \le i$, $1 \le j2 \le j$) generated by encoding the nose region of the portrait in the cut source image 210 through the feature extraction algorithm; and an element in a third embedding matrix of the source image may include an element $a_{i_3,j_3}$ ($1 \le i3 \le i$, $1 \le j3 \le j$) generated by encoding the mouth region of the portrait in the cut source image 210 through the feature extraction algorithm. At least one embedding matrix of the source image is configured as the first feature data A1, and the at least one embedding matrix of the source image includes, for example, the first embedding matrix of the source image, the second embedding matrix of the source image, and the third embedding matrix of the source image. It is to be noted that, although the embedding matrix of this embodiment is a two-dimensional matrix, the invention is not limited thereto. In other embodiments, the embedding matrix may also be a one-dimensional matrix or other forms of a matrix.

$$\begin{bmatrix} a_{1,1} & \cdots & a_{1,j} \\ \vdots & \ddots & \vdots \\ a_{i,1} & \cdots & a_{i,j} \end{bmatrix} \quad (1)$$

On the other hand, the feature extraction layer 301 may further encode at least one region of the first image 220 according to the feature extraction algorithm to generate at least one embedding matrix of the first image as shown in a matrix (2), in which m is greater than or equal to 1, and n is greater than or equal to 1. Taking FIG. 2 as an example, an element in an embedding matrix of the first image may include an element $b_{m1,n1}$ (1≤m1≤i, 1≤n1≤j) generated by encoding the forehead region of the portrait in the first image 220 through the feature extraction algorithm, and an element in a second embedding matrix of the first image may include an element $b_{m2,n2}$ (1≤m2≤i, 1≤n2≤j) generated by encoding the left eye region of the portrait in the first image 220 through the feature extraction algorithm. The first label data B1 includes at least one embedding matrix of the first image, such as the first embedding matrix of the first image and the second embedding matrix of the first image. It is to be noted that, although the embedding matrix of this embodiment is a two-dimensional matrix, the invention is not limited thereto. In other embodiments, the embedding matrix may also be a one-dimensional matrix or other forms of a matrix.

$$\begin{bmatrix} b_{1,1} & \ldots & b_{1,n} \\ \vdots & \ddots & \vdots \\ b_{m,1} & \ldots & b_{m,n} \end{bmatrix} \quad (2)$$

In an embodiment, the feature extraction algorithm may include an autoencoder, scale-invariant feature transform (SIFT), and/or a histogram of oriented gradients (HOG), but the invention is not limited thereto.

That is, the first embedding matrix of the source image, the second embedding matrix of the source image, and the third embedding matrix of the source image may be configured as the first feature data A1 adapted for pre-training the preliminary image recognition model 300, and the first embedding matrix of the first image and the second embedding matrix of the first image may be configured as the first label data B1 adapted for pre-training the preliminary image recognition model 300. Specifically, the layer 302 of the preliminary image recognition model 300 may be connected to the feature extraction layer 301 and may include two sub-layers, namely a normalization layer and a multi-head attention layer. After the first feature data A1 is generated, the normalization layer connected to the feature extraction layer 301 may normalize the first feature data A1 (such as normalizing the first embedding matrix of the source image, the second embedding matrix of the source image, and the third embedding matrix of the source image, respectively). The multi-head attention layer may implement an attention function on the normalized first feature data A1 to generate a correlation matrix A2 of the information of the correlation between each element pair in the first feature data A1. After the correlation matrix A2 is generated, an adder 311 of the preliminary image recognition model 300 may add the correlation matrix A2 and the first feature data A1 after positional encoding to generate a matrix A3.

The layer 303 of the preliminary image recognition model 300 may be connected to the layer 302 through the adder 311, and may include two sub-layers, namely a normalization layer and a feed forward layer. The normalization layer connected to the adder 311 may normalize the matrix A3. The normalized matrix A3 passes through the feed forward layer to generate a matrix A4. The feed forward layer may also include a fully connected layer adapted for outputting the matrix A4. An adder 312 of the preliminary image recognition model 300 may add the matrix A3 and the matrix A4 together to generate a matrix A5. The matrix A5 may be input to the softmax layer 304 to normalize the matrix A5 and generate an output image 306.

After generating the output image 306, the processor 110 may input the output image 306 and the first label data B1 to the loss function calculation model 400 of the storage medium 120 to calculate a loss function LF, so as pre-train the preliminary image recognition model 300 by using the loss function. For example, the loss function calculation model 400 may encode an image of the first region 22 corresponding to the output image 306 to generate a embedding matrix of an output label, calculate the loss function LF of the embedding matrix of the output label and the first label data B1, and feed the calculated loss function LF back to the preliminary image recognition model 300 for a pre-training adjustment.

Figure 4:
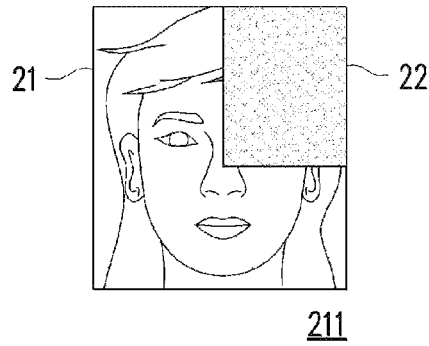
FIG. 4 is a schematic diagram of adding noise to a source image according to an embodiment of the invention.

In order to diversify the feature data and facilitate the noise processing ability of the image recognition model, the processor 110 may add noise to the feature data. FIG. 4 is a schematic diagram of adding noise to a source image according to an embodiment of the invention. Referring to FIGS. 3 and 4, the processor 110 may fill the first region 22 of the source image 200 with noise to generate a processed source image 211. Then, the processor 110 may encode at least one region of the processed source image 211 through the feature extraction layer 301 of the preliminary image recognition model 300 to generate at least one embedding matrix. The at least one embedding matrix may be configured as the first feature data A1 configured to pre-train the preliminary image recognition model 300.

Figure 5:
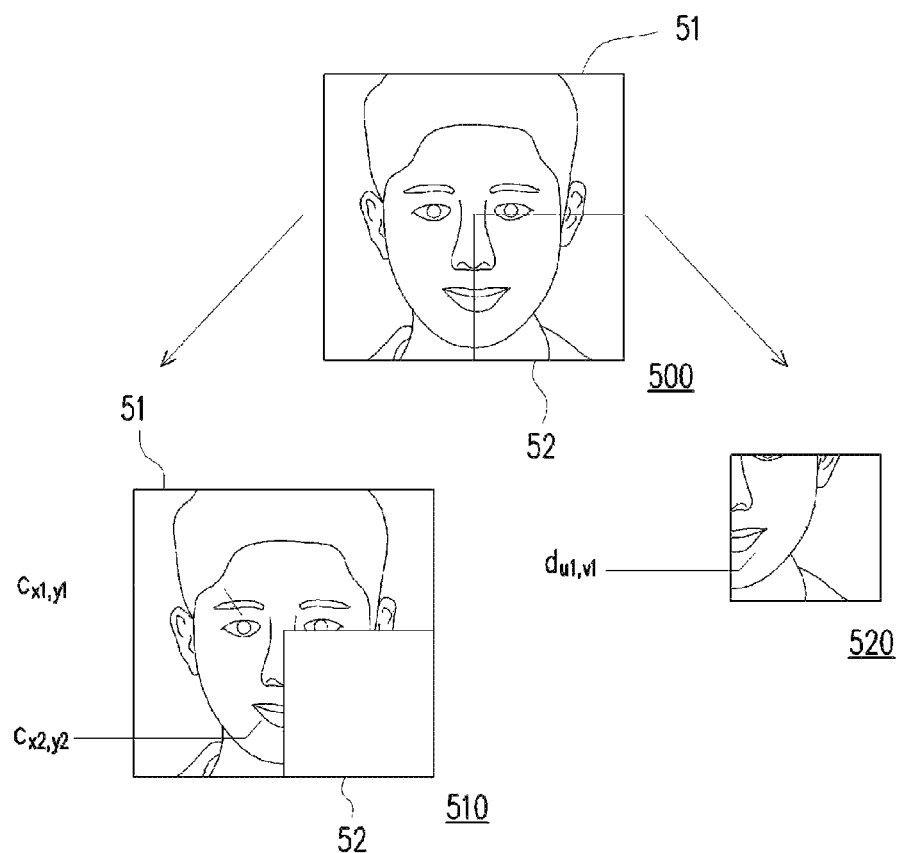
FIG. 5 is a schematic diagram of cutting a target image according to an embodiment of the invention.

After the pre-training of the preliminary image recognition model 300 is completed, the processor 110 may fine-tune the pre-trained preliminary image recognition model 310 to generate the image recognition model 320. Specifically, FIG. 5 is a schematic diagram of cutting a target image 500 according to an embodiment of the invention. The processor 110 may obtain the target image 500 through the transceiver 130. The target image 500 may include a second region 52 and an other region 51. After obtaining the target image 500, the processor 110 may cut a second image 520 out of the second region 52 of the target image 500 to generate a cut target image 510. It is to be noted that, the source image 200 is, for example, a large amount of non-special data image, and the target image 500 is, for example, a small amount of target data of a specific group or a specific target.

Then, the processor 110 may fine-tune the pre-trained preliminary image recognition model 310 according to second feature data C1 and second label data D1 to generate the image recognition model 320. The second feature data C1 may be associated with the cut target image 510, and the second label data D1 may be associated with the second image 520. In an embodiment, the processor 110 may encode at least one region of the cut target image 510 to generate at least one embedding matrix of the target image, configure the at least one embedding matrix of the target image as the second feature data C1, and encode the second image 520 to generate at least one embedding matrix of the second image. The second label data D1 includes the at least one embedding matrix of the second image. It is to be noted that, the preliminary image recognition model 300, the pre-trained preliminary image recognition model 310, and the image recognition model 320 have the same model architecture. The difference between the preliminary image recognition model 300, the pre-trained preliminary image recognition model 310, and the image recognition model 320 lies in different functions, different feature data, different weights, or different parameters in each layer, which are not particularly limited in the disclosure.

The method of fine-tuning the pre-trained preliminary image recognition model 310 to generate the image recognition model 320 is similar to the method of pre-training the preliminary image recognition model 300 to generate the pre-trained preliminary image recognition model 310, and details in this regard will not be repeated herein. It is to be noted that, the pre-trained preliminary image recognition model 310 may replace the preliminary image recognition model 300 by updating, and the image recognition model 320 may replace the pre-trained preliminary image recognition model 310 by updating, but the invention is not limited thereto. In other embodiments, after pre-training and fine-tuning, one pre-trained preliminary image recognition model 310 and one image recognition model 320 may be saved, respectively.

Figure 6:
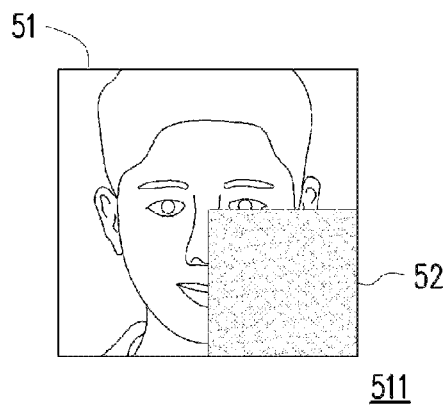
FIG. 6 is a schematic diagram of adding noise to a target image according to an embodiment of the invention.

In order to diversify the second feature data and facilitate the noise processing ability of the image recognition model, the processor 110 may add noise to the second feature data C1. FIG. 6 is a schematic diagram of adding noise to a target image according to an embodiment of the invention. Referring to FIG. 6, the processor 110 may fill the second region 52 of the target image 500 with noise to generate a processed target image 511. Then, the processor 110 may encode at least one region of the processed target image 511 through the feature extraction layer 301 of the preliminary image recognition model 300 to generate a second embedding matrix. The second embedding matrix may be configured as the second feature data C1 configured to fine-tune the pre-trained image recognition model 310 to generate the image recognition model 320.

Figure 7:
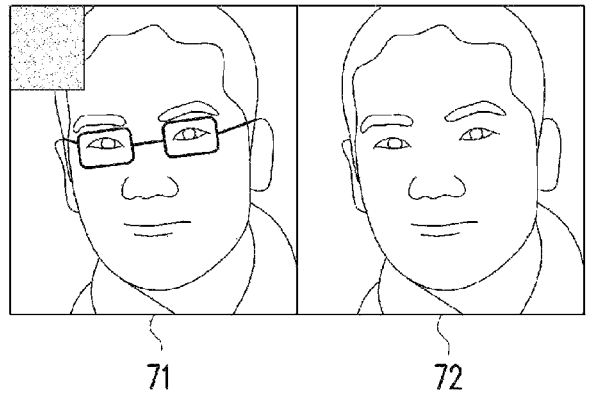
FIG. 7 is a schematic diagram of using an image recognition model to recognize an input image and a result according to an embodiment of the invention.

In the method of generating the image recognition model of the invention, during pre-training and fine-tuning, the cut image or the noise-containing image is input intentionally, and the image of the region that is originally cut is calculated as the loss function. Therefore, the image recognition model of the invention may remove the region where the image is interfered or noise in the input image and restore the input image to generate the output image. FIG. 7 is a schematic diagram of using an image recognition model to recognize an input image and a result according to an embodiment of the invention. Assuming that an input image 71 is an original image that is interfered by noise and includes an interference object (such as a pair of glasses), the user may input the input image 71 to an image recognition model. The image recognition model may recognize the input image 71 and generate an output image 72. The image recognition model may remove noise or the interference object in the input image 71 to generate the output image 72. For example, the input image 71 includes a noise region and a person wearing a pair of glasses. The image recognition model may remove the pair of glasses in the input image 71 and fill in the noise region to restore the original appearance of the person, thereby generating the output image 72.

Figure 8:
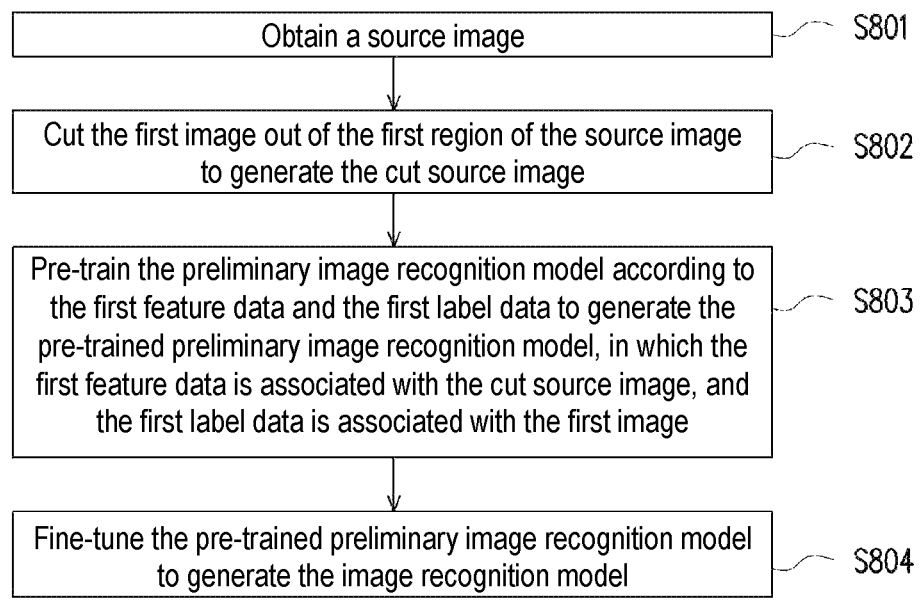
FIG. 8 is a flow chart of a method of generating an image recognition model according to an embodiment of the invention.

FIG. 8 is a flow chart of a method of generating an image recognition model according to an embodiment of the invention, in which the method may be implemented by the electronic device as shown in FIG. 1. Referring to FIGS. 1 and 8 together, in step S801, the source image 200 is obtained. In step S802, the first image 220 is cut out of the first region 22 of the source image 200 to generate the cut source image 210. In step S803, the preliminary image recognition model 300 is pre-trained according to the first feature data A1 and the first label data B1 to generate the pre-trained preliminary image recognition model 310. The first feature data A1 is associated with the cut source image 210, and the first label data B1 is associated with the first image 220. In step S804, the pre-trained preliminary image recognition model 310 is fine-tuned to generate the image recognition model 320.

In summary, in the embodiments of invention, the source image may be cut to generate the feature data and the label data adapted for pre-training, and the target image may be cut to generate the feature data and the label data adapted for fine-tuning. In addition, in the invention, the source image or the target image may be filled with noise to diversify the feature data. The image recognition model generated according to the embodiments of the invention may correctly restore the input image to generate the complete and noise-free output image when there is noise or deficiency in the input image.

The foregoing description of the preferred of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the invention is provided to comply with the rules requiring an abstract, which will allow a searcher to quickly ascertain the subject matter of the technical the invention of any patent issued from this the invention. It is submitted with the understanding that it will not be configured to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present the invention is intended to be dedicated to the public regardless of whether the element or component is explicitly recited in the following claims.

What is claimed is:

1. A method of generating an image recognition model, comprising:
    obtaining a source image;
    cutting a first image out of a first region of the source image to generate a cut source image, wherein the first image is different from the cut source image, and the first image and the cut source image form the source image;
    pre-training a preliminary image recognition model according to first feature data and first label data to generate a pre-trained preliminary image recognition model, wherein the first feature data is associated with the cut source image, and the first label data is generated by encoding the first image; and fine-tuning the pre-trained preliminary image recognition model to generate the image recognition model.

2. The method according to claim 1, wherein fine-tuning the pre-trained preliminary image recognition model to generate the image recognition model comprises:
obtaining a target image;
cutting a second image out of a second region of the target image to generate a cut target image; and
fine-tuning the preliminary image recognition model according to second feature data and second label data to generate the image recognition model, wherein the second feature data is associated with the cut target image, and the second label data is associated with the second image.

3. The method according to claim 1, further comprising:
encoding at least one region of the cut source image to generate at least one embedding matrix of the source image; and
configuring the at least one embedding matrix of the source image as the first feature data.

4. The method according to claim 2, further comprising:
encoding at least one region of the cut target image to generate at least one embedding matrix of the target image; and
configuring the at least one embedding matrix of the target image as the second feature data.

5. The method according to claim 3, wherein encoding the at least one region of the cut source image to generate the at least one embedding matrix of the source image comprises:
generating the at least one embedding matrix of the source image according to a feature extraction algorithm, wherein the feature extraction algorithm comprises at least one of an autoencoder, scale-invariant feature transform (SIFT), and a histogram of oriented gradients (HOG).

6. The method according to claim 1, further comprising:
filling the first region of the source image with noise to generate a processed source image;
encoding at least one region of the processed source image to generate at least one embedding matrix of the source image; and
configuring the at least one embedding matrix of the source image as the first feature data.

7. The method according to claim 2, further comprising:
filling the second region of the target image with noise to generate a processed target image;
encoding at least one region of the processed target image to generate at least one embedding matrix of the target image; and
configuring the at least one embedding matrix of the target image as the second feature data.

8. The method according to claim 2, wherein the image recognition model is a neural network model.

9. The method according to claim 3, wherein the embedding matrix is a one-dimensional matrix or a two-dimensional matrix.

10. An electronic device adapted for generating an image recognition model, the electronic device comprising a transceiver and a processor, wherein:
the transceiver is adapted for obtaining a source image; and
the processor is coupled to the transceiver, and is configured to:
cut a first image out of a first region of the source image to generate a cut source image, wherein the first image is different from the cut source image, and the first image and the cut source image form the source image;
pre-train a preliminary image recognition model according to first feature data and first label data to generate a pre-trained preliminary image recognition model, wherein the first feature data is associated with the cut source image, and the first label data is generated by encoding the first image; and
fine-tune the pre-trained preliminary image recognition model to generate the image recognition model.

* * * * *